United States Patent [19]

Cone et al.

[11] Patent Number: 4,700,656

[45] Date of Patent: Oct. 20, 1987

[54] QUICK-CLEANING, SCANNING/WEIGHING APPARATUS

[75] Inventors: Richard E. Cone, Cambridge; John F. Paugstat, Salesville, both of Ohio

[73] Assignee: NCR Corporation, Dayton, Ohio

[21] Appl. No.: 945,052

[22] Filed: Dec. 22, 1986

[51] Int. Cl.⁴ .................... G01G 19/00; G01G 3/14; G06K 7/10

[52] U.S. Cl. .................. 177/245; 177/211; 235/462

[58] Field of Search .............. 177/128, 211, 245; 235/462

[56] References Cited

U.S. PATENT DOCUMENTS

| 186,149 | 1/1877 | Montgomery . | |
|---|---|---|---|
| 1,062,603 | 5/1913 | Osborn . | |
| 1,634,084 | 6/1927 | Ruths . | |
| 2,196,334 | 4/1940 | Chamberlain . | |
| 2,879,960 | 3/1959 | Mortimer . | |
| 2,971,485 | 2/1961 | Hamlett . | |
| 3,268,996 | 8/1966 | Luketa . | |
| 4,258,810 | 3/1981 | Susor . | |
| 4,266,624 | 5/1981 | Dillon et al. . | |
| 4,396,079 | 8/1983 | Brendel | 177/211 X |
| 4,411,327 | 10/1983 | Lockery et al. | 177/211 |
| 4,566,548 | 1/1986 | Södler et al. . | |
| 4,574,899 | 3/1986 | Griffin | 177/211 |
| 4,656,344 | 4/1987 | Mergenthaler et al. | 235/462 |

Primary Examiner—George H. Miller, Jr.
Attorney, Agent, or Firm—Wilbert Hawk, Jr.; Albert L. Sessler, Jr.; Elmer Wargo

[57] ABSTRACT

A quick-cleaning, scanning/weighing apparatus. A scanning unit for use in scanning U.P.C. data on merchandise to be sold at a check-out counter and a weighing apparatus are combined in one apparatus. The weighing plate is mounted on projections on the load cells associated with the weighing beam assemblies used for weighing the merchandise at the apparatus.

6 Claims, 5 Drawing Figures

QUICK-CLEANING, SCANNING/WEIGHING APPARATUS

BACKGROUND OF THE INVENTION

This invention relates to a quick-cleaning, scanning-/weighing apparatus which is used, for example, with a retail terminal which is used in reading U.P.C. data on merchandise to be sold.

In recent years, there has been a trend to place U.P.C. (Universal Pricing Code) data on merchandise to be sold. When a customer presents the merchandise to be purchased at a check-out counter, an operator moves the merchandise so that the associated U.P.C. data thereon is moved in operative relationship with a scanning unit associated with a retail terminal at the check-out counter. The U.P.C. data which is read is used to electronically obtain the associated unit price and merchandise description which are printed on a sales slip by the retail terminal.

In an effort to compress several check-out functions into fewer terminals and to reduce the size of the check-out counter at a retail store, for example, U.S. patent application Ser. No. 707,916, which is assigned to the same assignee as the present invention, discloses a terminal which includes an apparatus which is used for scanning U.P.C. data on merchandise to be sold, and also for weighing items, like produce, at the check-out counter of a grocery store, for example.

One of the problems with such a scanning/weighing unit is that the scanning unit gets dusty or dirty and needs to be cleaned periodically. It is especially important that the scanning/weighing unit be disassembled quickly to effect the cleaning and that it also be assembled quickly after the cleaning is accomplished.

SUMMARY OF THE INVENTION

The present invention enables the scanning/weighing unit associated with a retail terminal at a check-out counter to be disassembled quickly to effect the cleaning of the scanning unit, and also to be assembled quickly after the cleaning is accomplished.

Another advantage is that when the scanning/weighing unit is disassembled for cleaning, there are no loose screws or small parts, for example, which could be lost easily.

A preferred embodiment of the scanning/weighing apparatus of this invention includes: a support plate having a predetermined number of holes therein; a scanning unit mounted in said support plate; a weighing beam assembly for each said hole, with each said weighing beam assembly including a load cell; means for mounting each said weighing beam assembly on said support plate so that its associated load cell projects upwardly through the associated said hole when said support plate is in a horizontal position; each said load cell having a projection; a weighing plate having a hole therein for each of said load cells, each said hole in said weighing plate being complementary in shape to each said projection and also being accurately located in said weighing plate to receive the associated said projection to enable said weighing plate to be supported on said load cells of said weighing beam assemblies; said weighing plate having a transparent section aligned with said scanning unit; and a scanning plate positioned over and supported on said weighing plate, with said scanning plate having a scanning opening therein which is aligned with said transparent section and said scanning unit.

The advantages mentioned, and others, will become more readily understood in connection with the following description, claims, and drawing.

DETAILED DESCRIPTION OF THE INVENTION

Figure 1:
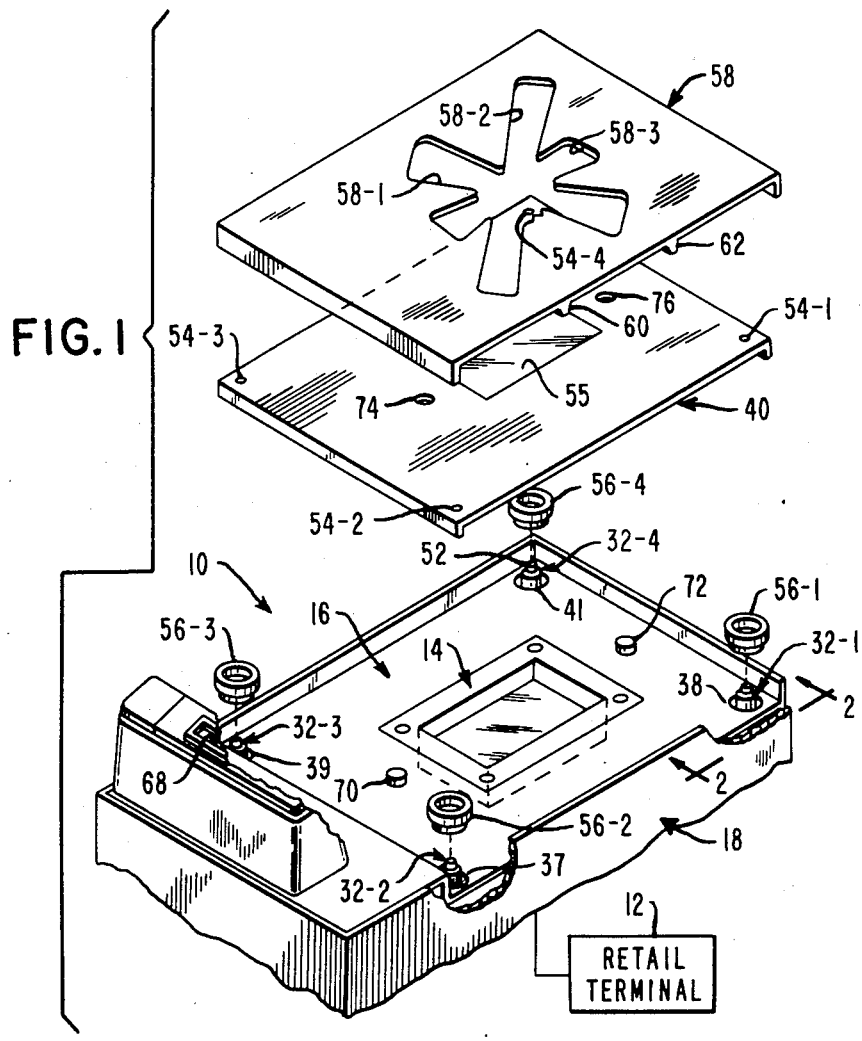
FIG. 1 is an exploded view, in perspective, of a portion of a terminal which includes the scanner/weighing apparatus of this invention.

FIG. 1 is an exploded view, in perspective, of a scanning/weighing apparatus, designated generally as 10, which may be used at a check out counter in a retail establishment, like a grocery store, for example. The apparatus 10 is generally used in conjunction with a retail terminal 12, shown only schematically in FIG. 1. In general, the apparatus 10 is used to read the U.P.C. code data on merchandise to be sold by moving the U.P.C. code data on the article in operative relationship with a scanning unit 14 secured to the base or support plate 16. A second function of the apparatus 10 is to weigh items which are sold by weight, items like fruits and vegetables, for example. Because the operations between the scanning unit 14 and the retail terminal 12 for determining and displaying the price of the merchandise being sold are conventional, no additional explanation relative to these operations is deemed necessary.

The apparatus 10 (FIG. 1) for weighing items includes the support plate 16 which is detachably mounted in the cabinet 18 of the apparatus 10 by conventional means (not shown). In the embodiment described, there are four, identical, weighing-beam assemblies used, with a weighing-beam assembly 20 being shown in FIG. 2. Each weighing-beam assembly (hereinafter referred to as beam assembly) includes a beam 22, a spacer 24, a return arm 26, and strain gages 28 and 30 which are all conventional. The beam assembly 20 also includes a load cell 32-1 having certain features which are part of this invention. The load cell 32-1 is secured to the free end of the return arm 26.

Figure 2:
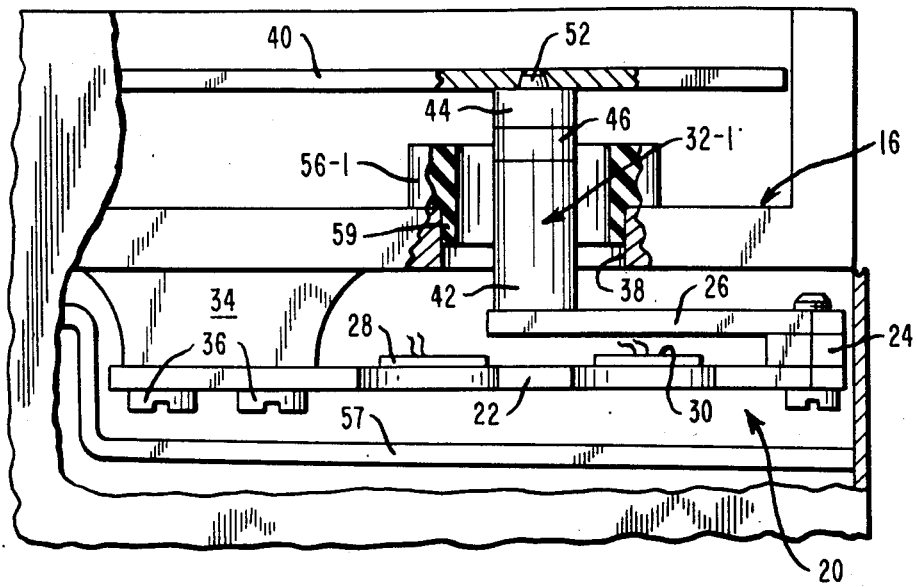
FIG. 2 is a general elevational view, taken along the line 2—2 of FIG. 1, to show details of a weighing beam assembly used and its relationships to a weighing plate.

The means for mounting the beam assembly 20 to the support plate 16 includes a boss 34, which extends or depends from the underside of the support plate 16, and also includes fasteners 36 as shown in FIG. 2. The beam assembly 20 is detachably secured to the support plate 16 so that its associated load cell 32 projects upwardly (as viewed in FIG. 2) when the support plate 16 is in the normal operating or horizontal position shown. The load cell 32-1 passes through a hole 38 in the support plate 16 and receives the weighing plate 40 as will be described hereinafter.

The support plate 16 has a predetermined number of holes, like 38, therein depending upon the number of beam assemblies, like 20, to be used. In the embodiment described, there are four beam assemblies, like 20, used, and these beam assemblies are mounted on the support plate 16 so that their associated load cells 32-1, 32-2, 32-3, and 32-4 project upwardly through the associated holes 37, 38, 39, and 41 respectively, in the support plate 16 as shown in FIG. 1. The beam assemblies, like 20, are accurately secured to the support plate 16 so that the longitudinal axes of the cylindrically-shaped load cells 32-1, 32-2, 32-3, and 32-4 intersect the corners of an imaginary quadrilateral.

Figure 4:
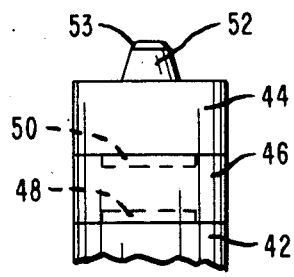
FIG. 4 is an enlarged view of a portion of the load cell shown in FIG. 2.
Figure 5:
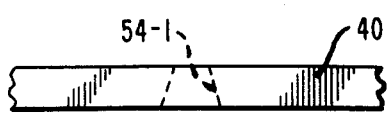
FIG. 5 is an enlarged view of a portion of the weighing plate shown in FIG. 2.

Each of the load cells, like 32-1, for example, includes a base portion 42 and a top portion 44, which portions are joined by a rubber section 46 as shown in FIG. 4. The base portion 42 has a centered, cylindrical projection 48 extending therefrom, and correspondingly, the top portion 44 has a centered, cylindrical projection 50 depending therefrom. In the embodiment described, the projections 48 and 50 are about 0.015 to 0.020 inch thick. The bottom portion 42 and the top portion 44 are placed spaced apart in a fixture (not shown) and rubber is injected in the space between and vulcanized to resiliently join the top portion 44 and the base portion 42 together. The purpose of the rubber section 46 is to absorb lateral shifts of the weighing plate 40 during scanning or weighing use of the apparatus 10 and thereby minimize laterally-directed stresses to the beam assemblies, like 20. These beam assemblies are designed to operate with only vertical forces applied along the vertical axis of the load cells, like 32-1. The rubber section 46 also protects the beam assemblies, like 20, from shock loading.

The top portion 44 of the load cell, like 32-1 (FIG. 4) includes a projection 52 which fits into a complementarily-shaped opening or hole 54-1 in the weighing plate 40 when the weighing plate is assembled on the projections 52 of the load cells 32-1, 32-2, 32-3 and 32-4. The weighing plate 40 has accurately-located holes 54-2, 54-3, and 54-4 (FIG. 1) therein which are similar to hole 54-1 to receive the projections 52 of load cells 32-2, 32-3, 32-4 and 32-1, respectively when the weighing plate 40 is mounted on the load cells, like 32-1, as shown in FIG. 2. The height of the projections, like 52, is equal to the thickness of the weighing plate 40 so as to present a flush top surface of the weighing plate. The top edge 53 of the projection 52 is chamfered to facilitate entry into its associated hole 54-1. The projection 52 may be cylindrically shaped or it may be shaped as a frustum of a cone as shown. For whatever shape is selected as a projection 52, the weighing plate 40 should have a complementarily-shaped opening, like 54-1, for example, to provide a snug fit therebetween. A cyldindrically-shaped projection 52 is shown for load cell 32-4 (FIG. 1).

The weighing plate 40 also has a glass transparent window 55 (FIG. 1) which is located therein to be positioned over the scanning unit 14 when the apparatus 10 is assembled as shown in FIG. 2. The apparatus 10 also has resilient, limit stops 56-1, 56-2, 56-3, and 56-4, as shown in FIG. 1, to limit the downward movement of the weighing plate 40 and thereby protect the associated weighing beam assemblies. The limit stops, like 56-1, are shaped as a thick, stepped washer, and they are cemented to the top side of the support plate 16; they perform the added function of sealing off the associated hole, like 38 in FIG. 2 to keep accidentally spilled liquids from reaching the associated beam assembly, like 20. The limit stop like 56-1 has a cylindrical section 59 (FIG. 2) which fits inside the hole 38 to provide the sealing mentioned. A collecting pan or chute 57 (FIG. 2), secured to the underside of the support plate 16, is used to direct spilled liquids away from the electronics of the apparatus 10.

The apparatus 10 (FIG. 1) also includes a black, plastic, scanning plate 58, having scanning openings therein, like 58-1, 58-2, and 58-3, to enable the scanning of U.P.C. data as previously described. The lower side of scanning plate 58 has ribs 60 and 62 to enable the plate 58 to be mounted on the weighing plate 50. The apparatus 10 also includes posts 70 and 72 which are upstanding from the support plate 16 and which are aligned with the holes 74 and 76, respectively, in the weighing plate 40. The diameters of the holes 74 and 76 are slightly larger than the diameters of the posts 70 and 72 to allow some lateral shift of the weighing plate 40 when an article to be scanned is moved over the apparatus 10 in the direction, for example, of arrow 78; however, the posts 70 and 72 prevent excessive lateral forces from being transferred to the weighing beam assemblies, like 20, for example.

Figure 3:
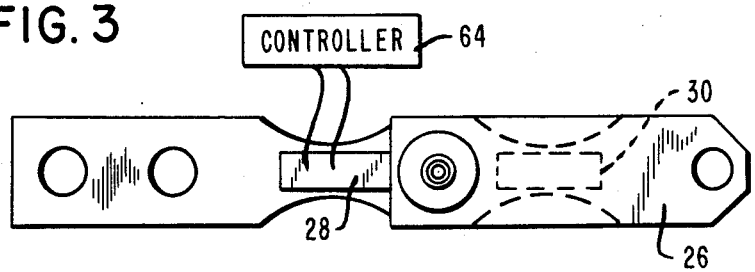
FIG. 3 is a top view of the weighing beam shown in FIG. 2.

The apparatus 10 is used for scanning by simply moving the U.P.C. data or label on the item to be sold over the scanning slots 58-1 through 58-3. The apparatus 10 is used for weighing by simply placing the item to be weighed on the scanning plate 58. When the scanning plate 58 and the weighing plate are moved downwardly by the weight of the item, the weighing beam assemblies, like 20, deflect or bend causing the associated strain gages 20 and 30 to generate signals which are routed to a controller 64 (FIG. 3) which conventionally gives an indication of the weight on an indicator 68. The controller 64 may also be coupled to the retail terminal 12 (FIG. 1) for incorporating the transaction in the terminal 12.

After the apparatus 10 has been used and dust and dirt accumulates on the transparent window 55 (FIG. 1) and the scanning unit 14, it is a simple matter to clean the apparatus. In this regard, the scanning plate 58 and then the weighing plate 16 are removed, permitting the window 55 and the scanning unit to be cleaned. After cleaning, the weighing plat 40 is mounted on the load cells 32-1 through 32-4 as previously described, and the scanning plate 58 is positioned over the weighing plate 40 to complete the assembly operation.

In summary, the apparatus 10 proves the following advantages or features:

1. The apparatus 10 is rugged in that it can withstand shear abuse when large numbers of articles are moved over the apparatus in the direction of arrow 78, for example;

2. The apparatus 10 is designed to enable the transparent window 55 and the scanning unit 14 to be easily cleaned;

3. The limit stops, like 56-1 also perform the function of sealing the holes, like 38, from accidentally spilled liquids; and 4. The tight fit between the projections (like 52) and their associated complementarily shaped holes (like 54-1) improve the accuracy of the apparatus 10.

What is claimed is:

1. A scanning/weighing apparatus comprising:
   a support plate having a predetermined number of holes therein;
   a scanning unit mounted in said support plate;
   a weighing beam assembly for each said hole, with each said weighing beam assembly including a load cell;

means for mounting each said weighing beam assembly on said support plate so that its associated load cell projects upwardly through the associated said hole when said support plate is in a horizontal position;

each said load cell having a projection;

a weighing plate having a hole therein for each of said load cells, each said hole in said weighing plate being complementary in shape to each said projection and also being accurately located in said weighing plate to receive the associated said projection to enable said weighing plate to be supported on said load cells of said weighing beam assemblies;

said weighing plate having a transparent section aligned with said scanning unit; and a scanning plate positioned over and supported on said weighing plate, with said scanning plate having a scanning opening therein which is aligned with said transparent section and said scanning unit.

2. The scanning/weighing apparatus as claimed in claim 1 in which each said projection is a frustum of a cone.

3. The scanning/weighing apparatus as claimed in claim 2 in which said support plate has four holes therein for said predetermined number and in which said four holes are located at the corners of an imaginary quadrilateral.

4. The scanning/weighing apparatus as claimed in claim 3 in which each said load cell is cylindrically shaped with the associated said projection being centrally located on one end of the load cell.

5. The scanning/weighing apparatus as claimed in claim 4 in which said support plate has a resilient member positioned around each of said predetermined number of holes to function as a limit stop and a liquid seal for the associated said beam assembly.

6. The scanning/weighing apparatus as claimed in claim 5 in which said support plate has first and second posts upstanding therefrom and said weighing plate has first and second holes therein which are aligned with said first and second posts, respectively, to minimize shifting of said weighing plate relative to said support plate.

* * * * *